(12) United States Patent
Van Druten et al.

(10) Patent No.: US 7,967,714 B2
(45) Date of Patent: Jun. 28, 2011

(54) DRIVE AND TRANSMISSION MODULE WITH A LAYOUT ADAPTED FOR A VEHICLE

(76) Inventors: Marie Roëll Van Druten, Eindhoven (NL); Gerard Bas Vroemen, Eindhoven (NL); Anita Franciscus Alexander Serrarens, Eindhoven (NL)

( * ) Notice: Subject to any disclaimer, the term of this patent is extended or adjusted under 35 U.S.C. 154(b) by 559 days.

(21) Appl. No.: 11/788,074

(22) Filed: Apr. 19, 2007

(65) Prior Publication Data
US 2007/0219038 A1 Sep. 20, 2007

(51) Int. Cl.
F16H 37/02 (2006.01)
F16H 3/72 (2006.01)
(52) U.S. Cl. .................... 475/211; 475/5; 475/218
(58) Field of Classification Search .............. 475/207, 475/210, 211, 218, 219, 302, 5, 149, 150
See application file for complete search history.

(56) References Cited

U.S. PATENT DOCUMENTS

| | | | |
|---|---|---|---|
| 4,471,668 A | | 9/1984 | Elsner et al. |
| 4,624,153 A | * | 11/1986 | Itoh et al. .................. 475/66 |
| 5,024,638 A | * | 6/1991 | Sakakibara et al. ........ 475/210 |
| 5,577,973 A | | 11/1996 | Schmidt |
| 5,730,675 A | | 3/1998 | Yamaguchi |
| 6,447,422 B1 | * | 9/2002 | Haka ........................ 475/211 |
| 6,659,901 B2 | * | 12/2003 | Sakai et al. ............... 475/218 |
| 6,716,128 B2 | * | 4/2004 | Kuramoto et al. .......... 475/207 |
| 6,986,725 B2 | * | 1/2006 | Morscheck ............... 475/210 |
| 7,637,836 B2 | * | 12/2009 | Watanabe et al. .......... 475/210 |
| 2001/0050190 A1 | | 12/2001 | Takenaka |
| 2007/0021259 A1 | * | 1/2007 | Tenberge .................. 475/5 |

FOREIGN PATENT DOCUMENTS

| | | |
|---|---|---|
| DE | 10116989 | 10/2002 |
| EP | 0845618 | 6/1998 |
| EP | 0952023 | 10/1999 |
| EP | 1209017 | 5/2002 |
| FR | 2824509 | 11/2002 |
| JP | 2001/030774 | 2/2001 |
| WO | WO 0020242 | 4/2000 |
| WO | WO 03/047898 | 6/2003 |
| WO | WO 2004/000595 | 12/2003 |

OTHER PUBLICATIONS

Author: Vroemen, Bas G., Title: Component Control for the Zero Inertia Powertrain, Date: 2001.
Author: Druten, Roell M. van, Title: Transmission Design of the Zero Inertia Powertrain, Date: 2001.

* cited by examiner

Primary Examiner — Roger Pang

(57) ABSTRACT

A drive consists of a drive source and a connected transmission module that is built up of a bypass transmission with connected supporting devices for the support of torque, a transmission, a torque converter, and several clutches and reductions. The bypass transmission has three rotation bodies and is made as a planetary gear. The third rotation body can be connected via a clutch to the supporting devices, which are formed by a flywheel. The first rotation body is connected via the torque converter to the drive source, and via a drive clutch to an ingoing shaft of the transmission. The second rotation body a finally is connected via a first and third reduction to an outgoing shaft of the transmission and the outgoing shaft can be connected via the first and second reduction to the driven wheels of a vehicle, which are depicted schematically by a rectangle. Each reduction is formed by two interlocking gear wheels, in which the first and third reduction possess a joint gear wheel.

16 Claims, 8 Drawing Sheets

DRIVE AND TRANSMISSION MODULE WITH A LAYOUT ADAPTED FOR A VEHICLE

BACKGROUND OF THE INVENTION

1. Field of the Invention

The invention relates to a drive for a vehicle comprising a drive source and a transmission module provided with an ingoing shaft, which is connected to the drive source, and an outgoing shaft, which can be connected to the driven wheels of a vehicle, which transmission module comprises supporting devices for the support of torque, and a transmission with an ingoing and an outgoing shaft, and a bypass transmission with at least three rotation bodies, of which a first rotation body is connected to the drive source, a second rotation body can be connected to the driven wheels of a vehicle, and a third rotation body can be connected to the supporting devices, which transmission is parallel to the bypass transmission, in which the ingoing shaft of the transmission is connected to the first rotation body and the outgoing shaft of the transmission is connected to the second rotation body.

2. Prior Art

Such a drive is known from Dutch patent application no. 1022092. This well-known drive cannot be simply used in existing vehicles with a transmission and end transmission because, to achieve the desired transmission, a lot of components (such as shafts and gear wheels) must be inserted in unfavourable places so that the volume and weight of the transmission increases.

SUMMARY OF THE INVENTION

An objective of the invention is to provide a drive of the sort described in the preamble in which the bypass transmission clutch and the transmission are made with the driven wheels of a vehicle and with each other in such a practically favourable way that fewer components are included and these components are introduced in more favourable places so that the drive can be made more compact and lighter. For this purpose the drive according to the invention is characterized in that the outgoing shaft of the transmission can be connected via a first and second reduction to the driven wheels of a vehicle and via a third reduction formed by one of the gear wheels of the first or second reduction and a further gear wheel that is interlocked with it, is connected to the second rotation body, so that the gear wheels of the first reduction are formed by a first gear wheel that is connected to the outgoing shaft of the transmission and a second gear wheel that is connected to a first gear wheel of the second reduction, of which second reduction a second gear wheel is connected to the driven wheels. By including a gear wheel of the first or second reduction in both the connecting line between the transmission and the bypass transmission and in the connecting line between the transmission and the driven wheels, a favourable and compact layout of a drive for a vehicle can be achieved, so that by a suitable choice of the transmission ratios of the reductions and the bypass transmission, little or no adaptation of the transmission ratios of the transmission and the end transmission is needed for use in existing vehicles.

An embodiment of the drive according to the invention is characterized in that the outgoing shaft of the transmission is connected via the second gear wheel of the first reduction to the second rotation body.

Another embodiment of the drive according to the invention is characterized in that the outgoing shaft of the transmission is connected via the first gear wheel of the first reduction and moreover is connected via a fourth reduction to the second rotation body.

An embodiment of this latter variant is characterized in that the further gear wheel of the third reduction is present on an intermediate shaft together with one of the gear wheels of the fourth reduction.

Another embodiment of this latter variant is characterized in that the further gear wheel of the third reduction also forms the first gear wheel of the fourth reduction.

A further embodiment is characterized in that the outgoing shaft of the transmission is connected via the second gear wheel of the second reduction and also via a fourth reduction to the second rotation body, in which the further gear wheel of the third reduction is present on an intermediate shaft together with one of the gear wheels of the fourth reduction.

A still further embodiment is characterized in that the connecting shaft or the intermediate shaft consists of two part-shafts, which can be disconnected from each other via a disengagement.

Again a further embodiment of the drive according to the invention is characterized in that there is a clutch in the part of the connecting line between the ingoing shaft of the transmission and the first rotation body, which is not present in the connecting line between the drive source and the first rotation body. This clutch can also act as a drive-off element, certainly if the drive is not provided with another drive-off element such as for example a torque converter. In addition this clutch can be used to disengage the transmission during driving so that the supporting devices support the engine torque towards the wheels. If the supporting devices consist of a flywheel (inertia), this will undergo negative acceleration so that the flywheel supplies extra power to the drive. By opening the clutch a higher negative acceleration can be achieved more quickly than if the clutch is not opened and a gear change is only made with the transmission. More power can thus be obtained from the flywheel with the clutch than from the well-known drive and the flywheel can therefore be made more compact and lighter.

If no other drive-off element such as a torque converter is present then an engine flywheel with a torsion spring will be preferred between the drive source and the transmission.

A further advantage of the drive according to the invention is that the supporting devices (inertias) also increase the torsional vibration suppression in the drive (both by use of a torque converter and by the use of a engine flywheel and torsion spring).

The supporting devices preferably comprise a mass inertia and/or an electromotor generator and an additional clutch is also preferably present between the supporting devices and the third rotation body. This additional clutch and/or drive unit for this additional clutch is preferably made so that the additional clutch engages and disengages automatically if the rotation direction of the third rotation body reverses.

This additional clutch can also be operated so that the drive source starts on closing this clutch. The energy in the supporting devices (flywheel) is then used to increase the rpm of the drive source from a stationary position. In this way the drive source can be started very quickly so that it becomes possible to switch off the drive source when the vehicle is stationary so that extra fuel is saved. In this way a larger electrical starting motor does not have to be used.

Again a further embodiment is characterized in that a drive-off element, a torque converter for example, is present between the drive source and the transmission.

Driving off from a stationary position (both forwards and in reverse) can also be done favourably with a drive in which a further bypass transmission is present between the drive source and the transmission with at least three rotation bodies, of which a first rotation body can be blocked against rotation, for example if this rotation body can be connected to a housing of the transmission module via a brake, a second rotation body is connected to the drive source, and a third rotation body is connected to the transmission, which further bypass transmission is provided with a lock-up clutch between the second and third rotation body.

The vehicle can be driven forwards by means of the slipping closure of the lock-up clutch and in reverse by means of the slipping closure of the brake. Forward or reverse drive can be selected by means of the clutch and the brake if a torque converter is present.

Further the lock-up clutch can also serve to disengage the transmission during driving so that the supporting devices support the engine torque towards the wheels, see above.

Moreover an electromotor generator can also be used for driving off, which is present between the drive source and the first rotation body.

An engine flywheel with a torsion spring can also preferably be present between the drive source and the transmission instead a torque converter.

To change the turning direction of the outgoing shaft of the drive in a favourable way (without further bypass transmission), which shaft can be connected to the driven wheels of a vehicle, a further embodiment of the drive according to the invention is characterized in that the first gear wheel of the first reduction can be disengaged from the outgoing shaft of the transmission, and in that the drive comprises a further gear wheel that can be connected to the outgoing shaft of the transmission and which is interlocked with the gear wheel of the second reduction, which is connected to the driven wheels. Claw clutches can preferably be used to change gear. Note that this embodiment can also be used in a drive in which there is no bypass transmission with supporting devices and no third reduction, which are parallel to the transmission.

This embodiment of the drive is moreover preferably provided with a brake, which is connected to the outgoing shaft of the transmission or to the ingoing shaft of the transmission between a drive clutch, which is present between the drive source and the transmission, and the transmission. This embodiment with brake can also be used with other drives, i.e. also with drives without a bypass transmission with supporting devices. Preferably the brake is here connected to the gear handle, which activates the brake when put into reverse. The advantage of this is that the driver does not have to brake with his foot to put the drive into reverse.

To prevent a double action when changing gears, for example changing into forward and reverse, a still further embodiment is characterized in that the drive comprises an axially movable selector shaft, which is provided with external toothing axially separated from each other, which selector shaft can be axially moved in central holes in gear wheels, which are provided with internal toothing, and a shaft, so that the selector shaft can connect none or one, but not two or more of the above gear wheels to the shaft. Note here as well that this embodiment can be used on any drive in which if desired a shaft can be changed with one of a number of gear wheels present on the shaft.

The invention also relates to a transmission module usable in a drive according to the invention, in which the ingoing shaft of the transmission module can be connected to the drive source of the drive.

BRIEF DESCRIPTION OF THE DRAWINGS

The invention will be elucidated more fully below on the basis of drawings in which embodiments of the drive according to the invention are shown. In these drawings.

DETAILED DESCRIPTION OF THE DRAWINGS

Figure 1:
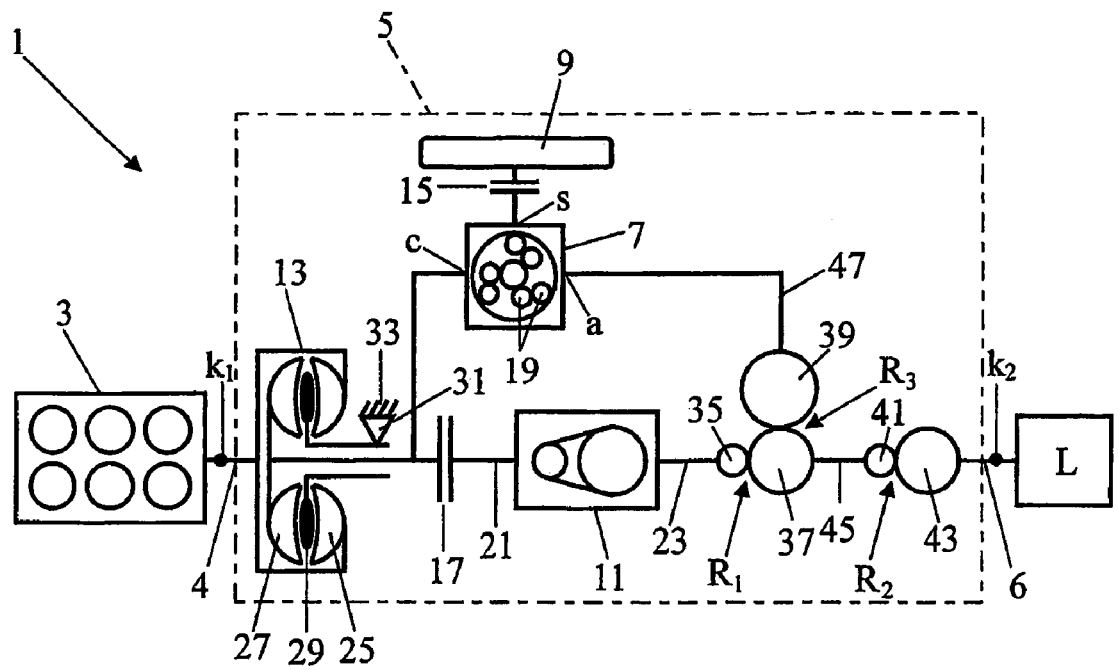
FIG. 1 shows a diagram of a first embodiment of the drive according to the invention.
Figure 2:
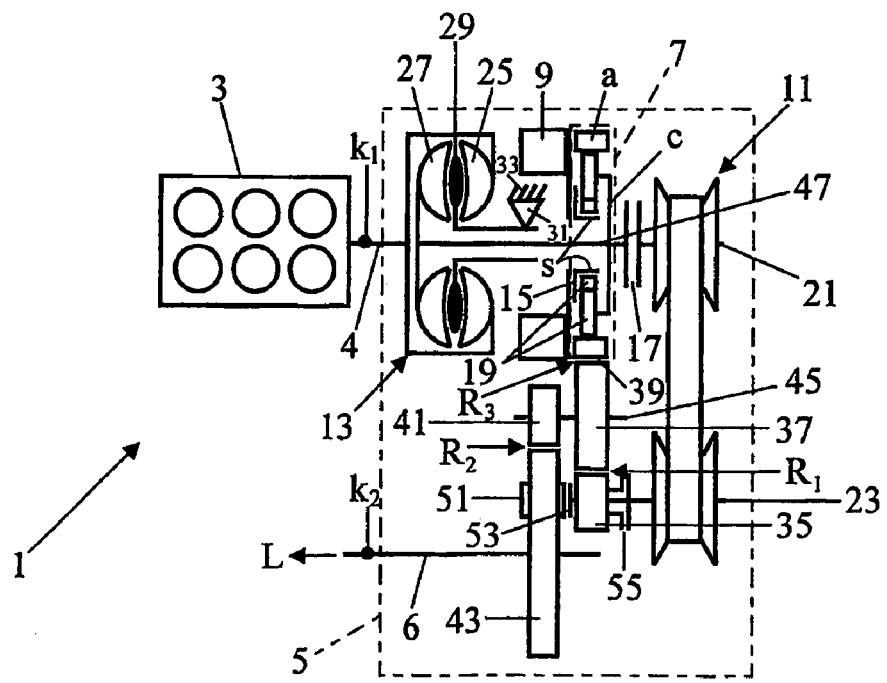
FIG. 2 shows a plan of a practical layout of the drive shown in FIG. 1.
Figure 3:
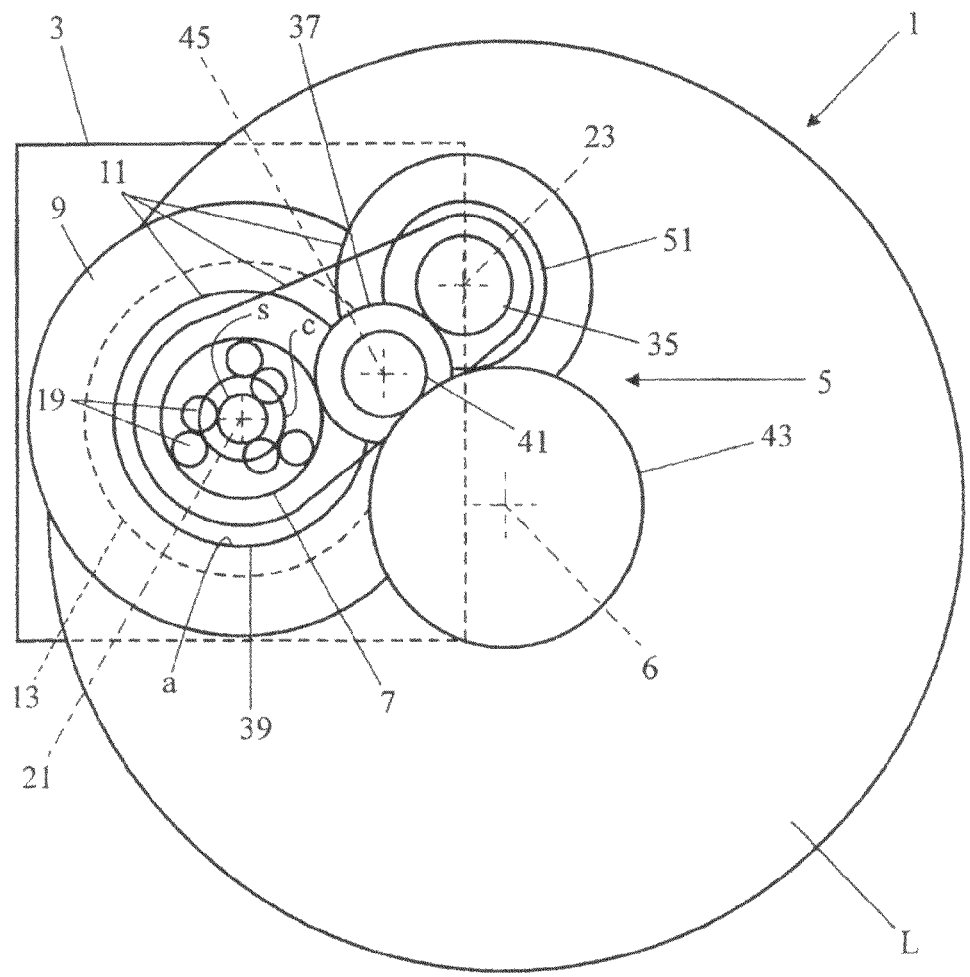
FIG. 3 shows a side elevation of the practical layout shown in FIG. 2.

FIGS. 1 and 2 show diagrams of a first embodiment of the drive according to the invention as a plan and side elevation and FIG. 3 shows a practical layout in cross-section of this drive. The drive 1 consists of a drive source 3 and a transmission module 5. The transmission module 5 has an ingoing shaft 4, which is connected via a shaft clutch $k_1$ to the drive source 3, and an outgoing shaft 6, which can be connected via a shaft clutch $k_2$ to the driven wheels L of a vehicle, which are depicted in FIG. 1 schematically by a rectangle. The transmission module 5 is built up of a bypass transmission 7 with connected supporting devices 9 for the support of torque, a transmission 11, a torque converter 13 and several clutches 15, 17 and reductions $R_1$, $R_2$, $R_3$.

The bypass transmission 7 has three rotation bodies c, a, s and is made as a planetary gear, in which a first rotation body c is formed by a planet carrier, a second rotation body a by a ring wheel and a third rotation body s by a sun wheel, in which several pairs of planetary wheels 19 are present between the sun wheel s and the ring wheel a, which are rotatably fastened to the planet carrier c. The third rotation body s can be connected via a clutch 15 to the supporting devices 9, which are formed by a flywheel. The first rotation body c is connected via the torque converter 13 to the drive source 3, and via a drive clutch 17 to an ingoing shaft 21 of the transmission 11. The second rotation body a, finally, is connected via a third and first reduction $R_3$ and $R_1$ respectively to an outgoing shaft 23 of the transmission 11, which outgoing shaft 23 can be connected to the driven wheels L of a vehicle via the first and second reduction $R_1$, $R_2$.

The transmission 11 is made as a generally known continuously variable transmission. The torque converter 13 has two rotation bodies 25, 27 between which there is a liquid, and a third rotation body 29, which is present between the above two rotation bodies 25, 27 and which is connected via a neutral bearing 31 to a housing 33 of the transmission module 5. The first rotation body 25 is connected to the drive source 3 and the second rotation body 27 is connected to the first rotation body c.

Each reduction $R_1$, $R_2$, $R_3$ is formed by two interlocking gear wheels 35-43, in which the first and third reduction $R_1$, $R_3$ have a joint gear wheel 37. The gear wheel 39 of the third reduction $R_3$ is formed by external toothing on the second rotation body a (the ring wheel) or it is formed by a gear wheel that is fastened to the second rotation body a. The transmission ratio $i_1$ of the first reduction $R_1$, being the rotation speed of the outgoing shaft 45 of the first reduction divided by the rotation speed of the ingoing shaft of the first reduction or the rotation speed of the outgoing shaft 23 of the transmission, is approximately equal to 31 0.7. The transmission ratio $i_3$ of the third reduction $R_3$, being the rotation speed of the outgoing shaft 45 of the third reduction divided by the rotation speed of the ingoing shaft 47 of the third reduction or of the second rotation body a, is approximately equal to −1. The transmission ratio $i_2$ of the second reduction $R_2$, being the rotation speed of the outgoing shaft of the second reduction, or the rotation speed of the outgoing shaft 6 of the transmission module 5 divided by the rotation speed of the ingoing shaft of the second reduction, or the rotation speed of the outgoing shaft 45 of the first reduction, is approximately equal to −0.3. The transmission ratio of the planetary gear being the ratio between the number of teeth on the ring wheel and the sun wheel, is equal or approximately equal to −2.7. The minus sign here means that the sun wheel is connected to the ring wheel via a planetary wheel pair instead of via single planetary wheels.

The reverse transmission of the drive is formed by a further gear wheel 51, which can be connected via the clutch 53 to the outgoing shaft 23 of the transmission 11, and which is interlocked with the gear wheel 43 of the second reduction $R_2$. The gear wheel 35 of the second reduction, which is connected to the outgoing shaft 23 of the transmission 11, can for this purpose be disengaged from the outgoing shaft 23 via the clutch 55.

The reverse can only be engaged if the vehicle is stationary. The brake pedal has to be depressed to engage the reverse with well-known vehicles. It is not necessary for the brake pedal to be depressed with a brake B (see FIG. 1), which is operated by the gear handle 11 when this is moved to the reverse position. The brake B is connected to the ingoing or outgoing shaft 21, 23 of the transmission 11.

Figure 5:
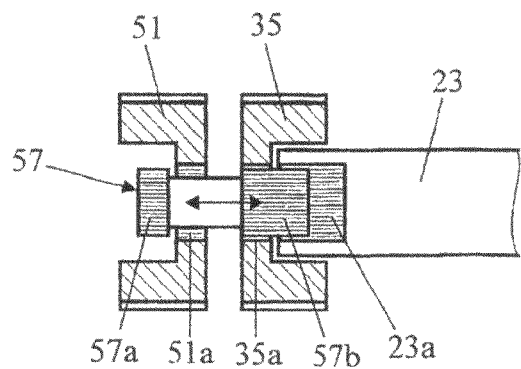
FIG. 5 shows a selector shaft of the practical embodiment of the drive shown in FIG. 4 in detail.
Figure 4:
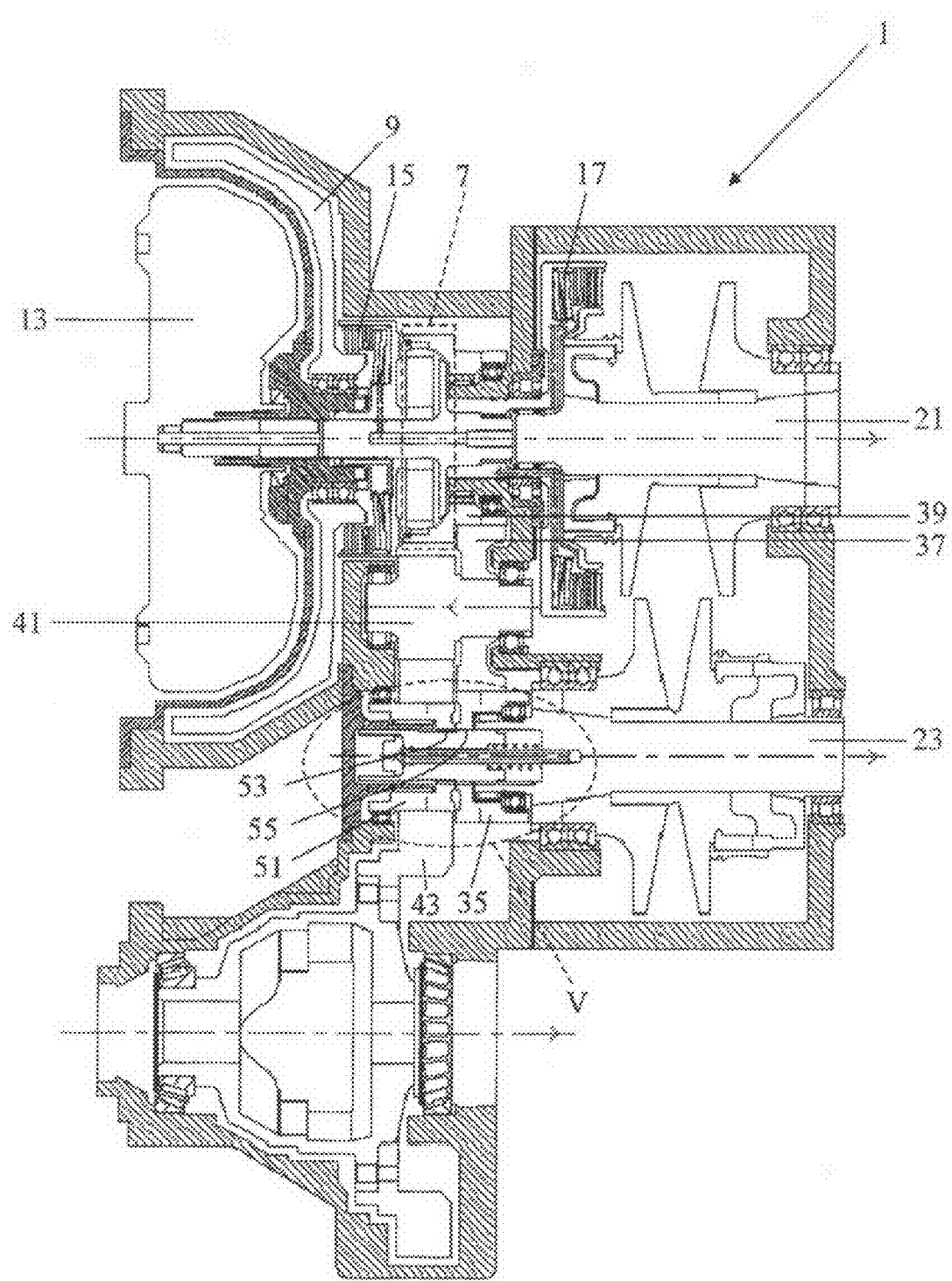
FIG. 4 shows a constructive representation of the drive shown in FIG. 1.

FIG. 4 shows a constructive depiction of the layout of the drive 1 shown in FIGS. 2 and 3. All parts with a similar function are indicated by the same reference numbers. FIG. 5 gives a detailed diagram of the construction of the clutches 53 and 55 for the connection of the shaft 23 to either gear wheel 51 or gear wheel 35 or to neither, but in any event not simultaneously to both, (indicated by V in FIG. 4). The clutches 53 and 55 of the drive 1 have an axially movable selector shaft 57, which is provided with external toothing 57a, 57b at an axial distance from each other. The selector shaft 57 can be moved axially by central holes in the gear wheels 35 and 51 and in the shaft 23. The holes are provided with internal toothing 35a, 51a, and 23a.

Figure 6:
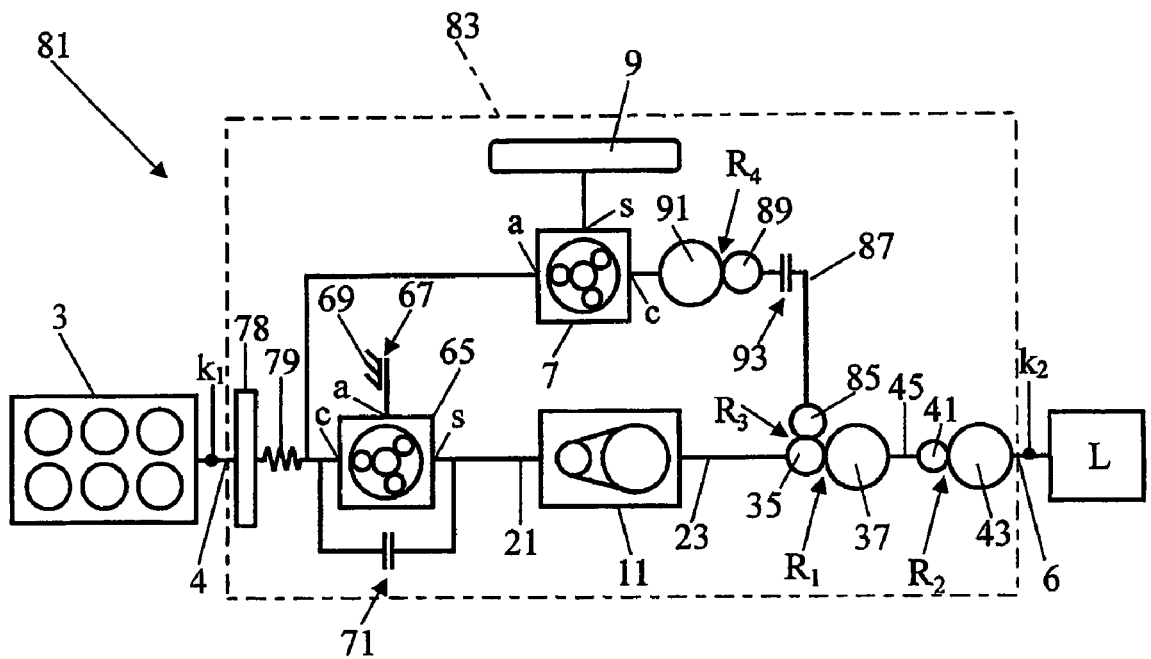
FIG. 6 shows a diagram of a second embodiment of the drive according to the invention.
Figure 7:
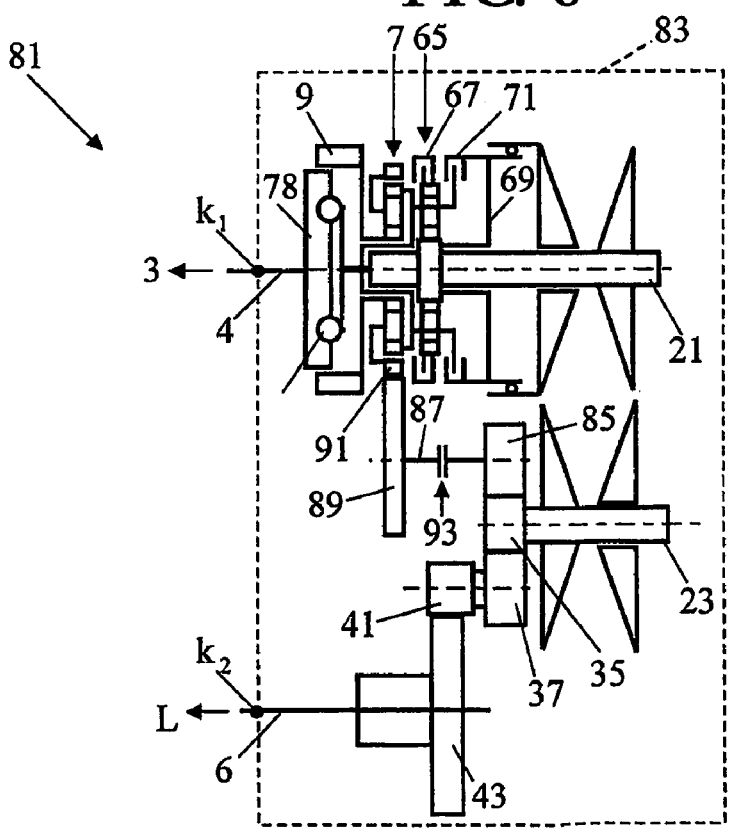
FIG. 7 shows a plan of a practical layout of the drive shown in FIG. 6.

FIGS. 6 and 7 show a diagram and a plan of a practical layout of a second embodiment of the drive 81 according to the invention. All parts of the drive 81 and the transmission module 83 which are equal to those of the above second embodiment are indicated by the same reference numbers.

In this embodiment of the drive 81 the outgoing shaft 23 of the transmission 11 is not connected via the second gear wheel of the first reduction, but via the first gear wheel 35 of the first reduction $R_1$ to the second rotation body c of the bypass transmission 7. The first gear wheel 35 also forms a gear wheel of the third reduction $R_3$ of which the other gear wheel 85 is connected via an intermediate shaft 87 to a gear wheel 89 of a fourth reduction $R_4$ of which the other gear wheel 91 is connected to the second rotation body c. Intermediate shaft 87 here also consists of two part-shafts, which can be disengaged separately via a disengagement 93.

Figure 8:
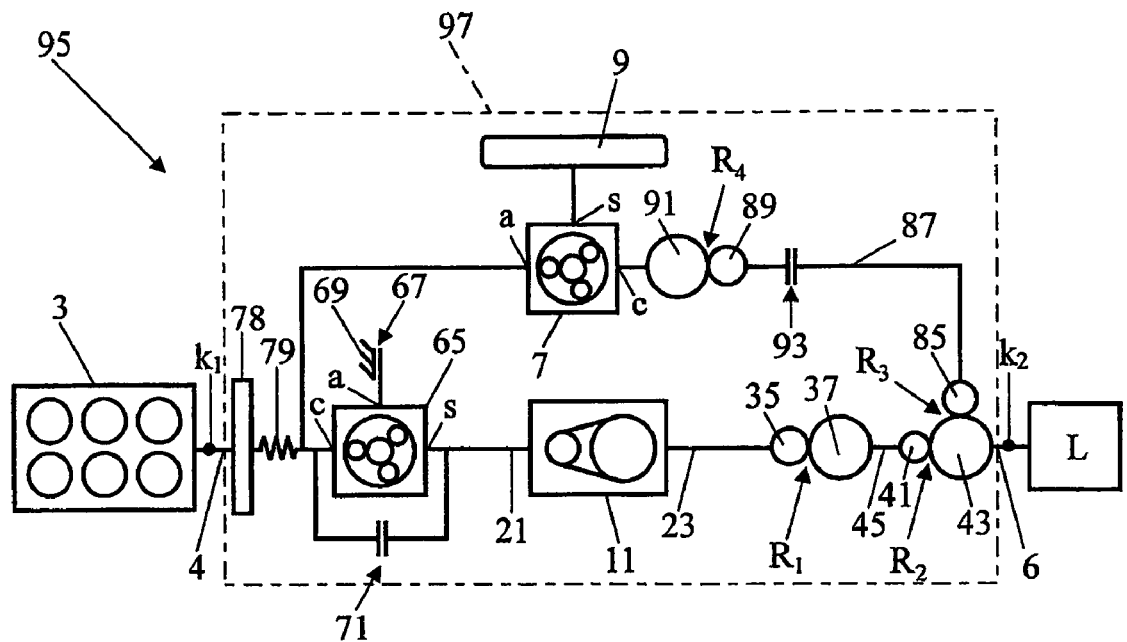
FIG. 8 shows a diagram of a third embodiment of the drive according to the invention.
Figure 9:
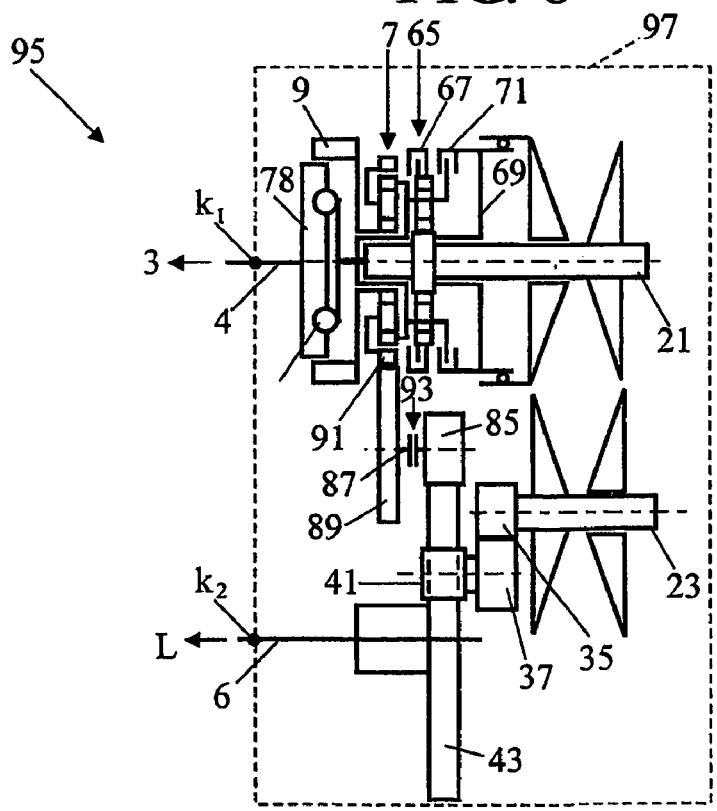
FIG. 9 shows a plan of a practical layout of the drive shown in FIG. 8.

FIGS. 8 and 9 show a diagram and a plan of a practical layout of a third embodiment of the drive 95 according to the invention. All parts of this drive 95 and transmission module 97 which are equal to those of the above third embodiment are indicated by the same reference numbers.

In this embodiment of the drive 95 the outgoing shaft 23 of the transmission 11 is not connected via the second gear wheel of the first reduction, but via the second gear wheel 43 of the second reduction $R_2$ to the second rotation body c of the bypass transmission 7. The second gear wheel 43 also forms a gear wheel of the third reduction $R_3$ of which the other gear wheel 85 is connected via an intermediate shaft 87 to a gear wheel 89 of a fourth reduction $R_4$ of which the other gear wheel 91 is connected to the second rotation body c. Intermediate shaft 87 here also consists of two part-shafts, which can be disengaged separately via a disengagement 93.

Figure 10:
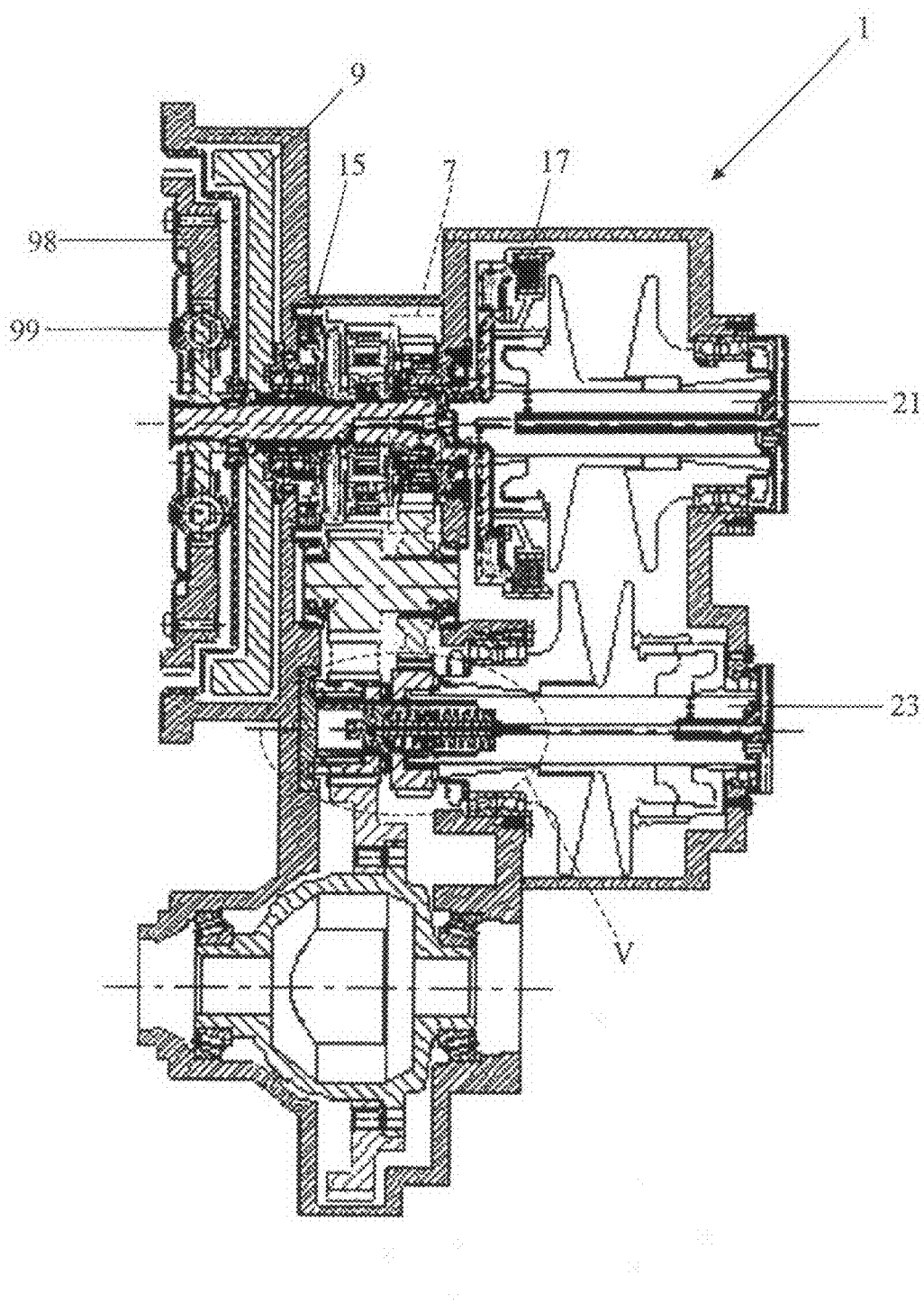
FIG. 10 shows an alternative of the constructive embodiment represented in FIG. 4.

The ingoing shaft 4 of the transmission module 5 can also be directly connected to the drive source 3, instead of via the shaft clutch $k_1$, and the outgoing shaft 6 of the transmission module can also be directly connected to the driven wheels L, instead of via the shaft clutch $k_2$. Moreover, the torque converter in the drive shown in FIGS. 1 to 4 can also be replaced by an engine flywheel 78 with a torsion spring 79, see FIG. 10, in which an alternative of the constructive embodiment shown in FIG. 4 is shown.

Figure 11:
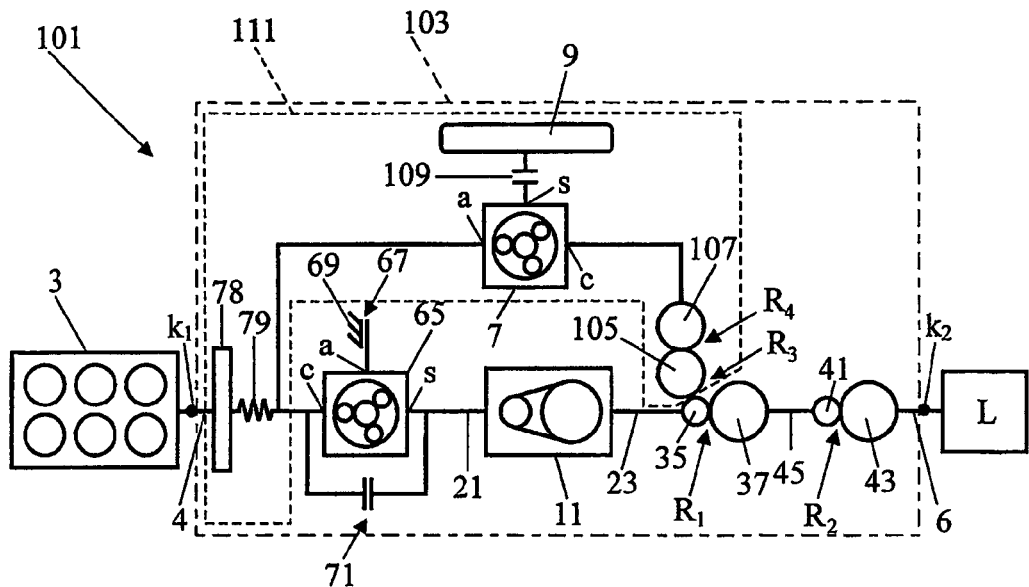
FIG. 11 shows a diagram of a fourth embodiment of the drive according to the invention.

FIG. 11 shows a diagram of a fourth embodiment of the drive according to the invention. All parts of this drive 101 and the transmission module 103 which are equal to those of the above described third embodiment are indicated by the same reference numbers. Just as with the third embodiment shown in FIG. 6, the outgoing shaft 23 of the transmission 11 is connected via the first gear wheel 35 of the first reduction $R_1$ and moreover via a fourth reduction $R_4$ to the second rotation body c. The first gear wheel 35 of the first reduction $R_1$ here also forms one of the gear wheels of the third reduction $R_3$. However, contrary to the case of the second embodiment, the other gear wheel 105 of the third reduction $R_3$ here also forms the first gear wheel of the fourth reduction $R_4$. The other gear wheel 107 of the fourth reduction $R_4$ is fastened to the second rotation body c. There is an additional clutch 109 between the flywheel 9 and the third rotation body s to be able to disengage the flywheel 9. The module, which is indicated by the border 111, here forms an add-on module, which can be added to an existing drive, for which the existing drive only has to be minimally adapted.

Figure 12:
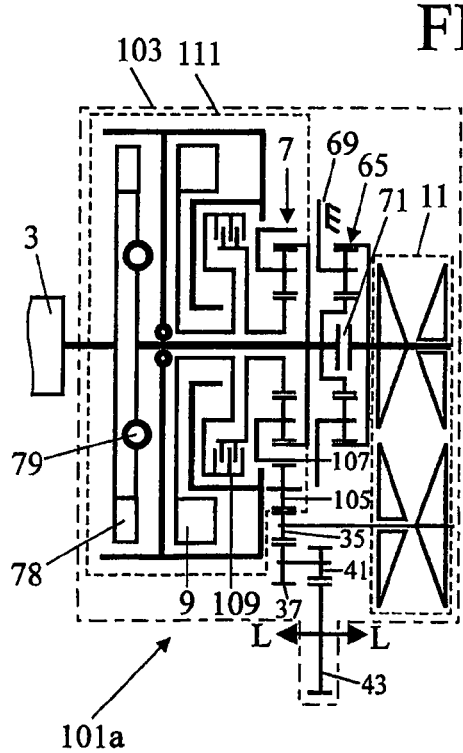
FIG. 12 shows a first practical layout of the drive shown in FIG. 11.
Figure 13:
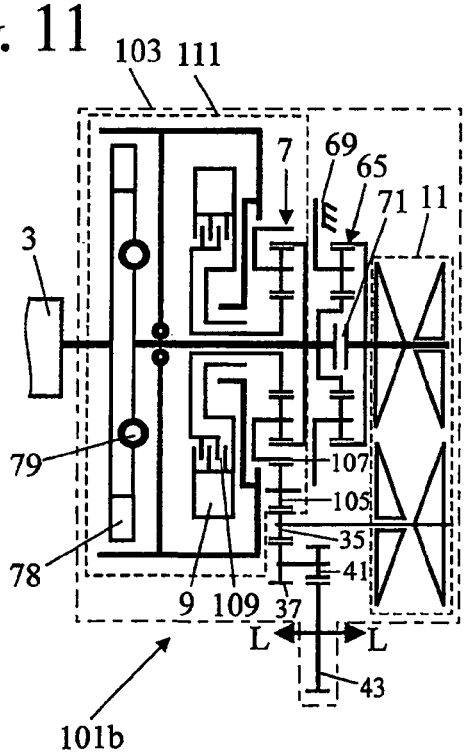
FIG. 13 shows a second practical layout of the drive shown in FIG. 11.
Figure 14:
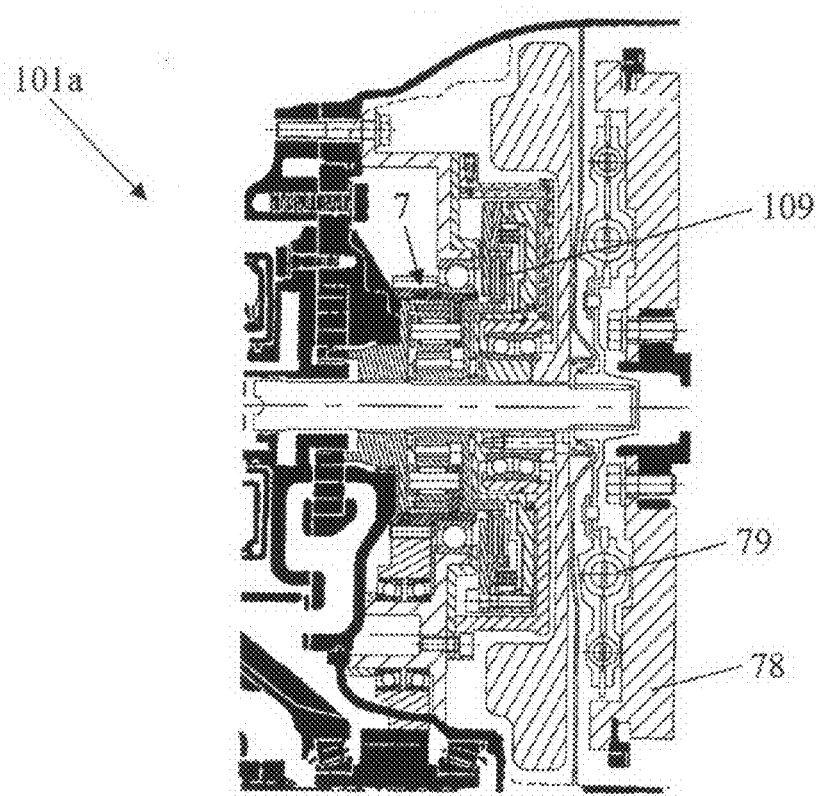
FIG. 14 shows a constructive depiction of the first practical lay-out shown in FIG. 12.
Figure 15:
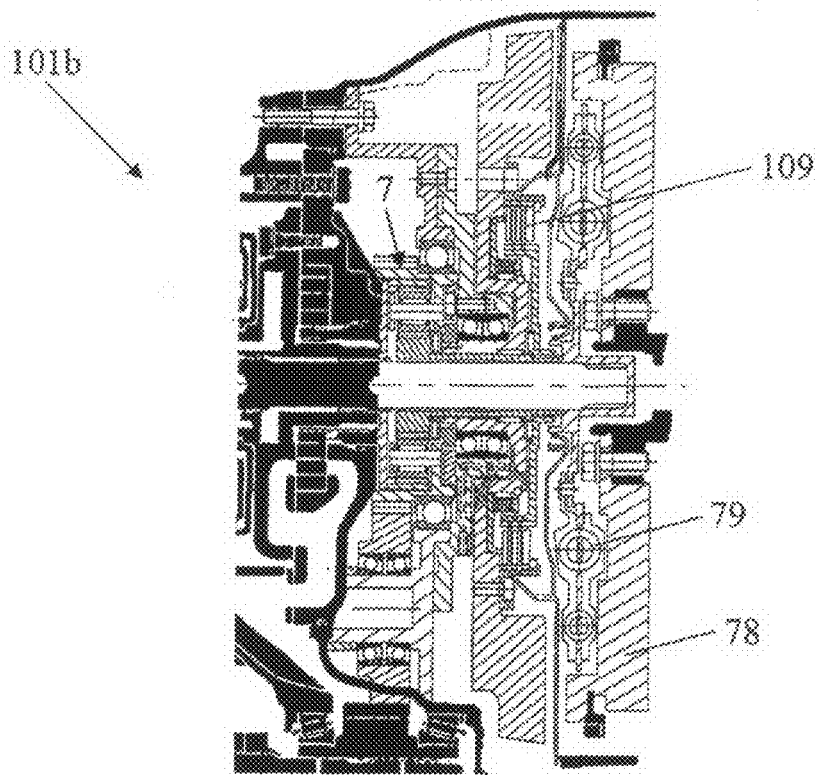
FIG. 15 shows a constructive depiction of the second practical layout shown in FIG. 13.

FIGS. 12 and 13 are two different practical layouts 101a and 101b of the drive shown in FIG. 11. The difference between both layouts 101a and 101b is the position of the additional clutch 109 between the flywheel 9 and the third rotation body s. FIGS. 14 and 15 finally show constructive embodiments of both practical layouts 101a and 101b.

Although in the above the invention is explained on the basis of the drawings, it should be noted that the invention is in no way limited to the embodiments shown in the drawings. The invention also extends to all embodiments deviating from the embodiments shown in the drawings within the context defined by the claims.

What is claimed is:

1. A drive for a vehicle having a drive source and driven wheels, the drive comprising:
   a transmission module having an ingoing shaft adapted to be connected to the drive source and an outgoing shaft adapted to be connected to the driven wheels;
   a supporting device for supporting torque;
   a transmission having an ingoing shaft and an outgoing shaft, the ingoing shaft of the transmission being adapted to be engaged with the ingoing shaft of the transmission module;
   a bypass transmission with at least three rotation bodies, of which a first rotation body is adapted to be connected to the drive source via the ingoing shaft of the transmission module, a second rotation body is adapted to be connected to the driven wheels of a vehicle via the outgoing shaft of the transmission module, and a third rotation body connected to the supporting devices, which bypass transmission is parallel to the transmission;
   a first reduction and a second reduction, each formed of two gear wheels of different diameters interlocked with each other;
   wherein the ingoing shaft of the transmission is connected via both interlocking gear wheels of the first and second reduction to the outgoing shaft of the transmission module; and
   a third reduction formed of two gear wheels interlocked with each other of which one is one of the gear wheels of the first or second reductions and the other is a further gear wheel, the third reduction being connected to the second rotation body of the bypass transmission,
   wherein the gear wheels of the first reduction are formed by a first gear wheel, which is connected to the outgoing shaft of the transmission and a second gear wheel, which is connected to a first gear wheel of the second reduction, of which second reduction a second gear wheel is connected to the driven wheels.

2. Drive according to claim 1, characterized in that an engine flywheel with a torsion spring is present between the drive source and the transmission.

3. Drive according to claim 2, characterized in that the further gear wheel of the third reduction, together with one of the gear wheels of a fourth reduction, is present on an intermediate shaft.

4. Drive according to claim 3, characterized in that the further gear wheel of the third reduction also forms the first gear wheel of the fourth reduction.

5. Drive according to claim 4, characterized in that the outgoing shaft of the transmission via the second gear wheel of the second reduction and moreover via a fourth reduction is connected to the second rotation body, in which the further gear wheel of the third reduction, together with one of the gear wheels of the fourth reduction, is present on an intermediate shaft.

6. Drive according to claim 1, characterized in that an electromotor generator is present between the drive source and the transmission.

7. Drive according to claim 1, characterized in that a clutch is present in the part of the connecting line between the ingoing shaft of the transmission and the first rotation body, which is not present in the connecting line between the drive source and the first rotation body.

8. Drive according to claim 1, characterized in that the supporting device comprise a mass inertia.

9. Drive according to claim 1, characterized in that the supporting device contain an electromotor generator.

10. Drive according to claim 9, characterized in that an additional clutch is present between the supporting device and the third rotation body.

11. Drive according to claim 10, characterized in that the additional clutch and/or a drive unit for the additional clutch is made so that the additional clutch engages and disengages automatically if the rotation direction of the third rotation body reverses.

12. Drive according to claim 1, characterized in that a drive-off element is present between the drive source and the transmission.

13. Drive according to claim 1, characterized in that a further bypass transmission is present between the drive source and the transmission with at least three rotation bodies, of which a first rotation body can be blocked against rotation, wherein if this rotation body can be connected to a housing of the transmission module via a brake, a second rotation body is connected to the drive source, and a third rotation body is connected to the transmission, which further bypass transmission is provided with a lock-up clutch between the second and third rotation body.

14. Drive according to claim 1, characterized in that the first gear wheel of the first reduction can be disengaged from the outgoing shaft of the transmission, and that the drive comprises a further gear wheel that can be connected to the outgoing shaft of the transmission and which is interlocked with the gear wheel of the second reduction, which is connected to the driven wheels.

15. Drive according to claim 14, characterized in that the drive moreover comprises a drive clutch, which is present between the drive source and the transmission, and a brake, which is connected to the outgoing shaft of the transmission or to the ingoing shaft of the transmission between the drive clutch and the transmission.

16. Drive according to claim 15, characterized in that the brake is connected to the gear handle and is activated by this if this is moved into reverse.

* * * * *